C. ROGERS.
Device for Hitching Horses.
No. 59,660. Patented Nov. 13, 1866.
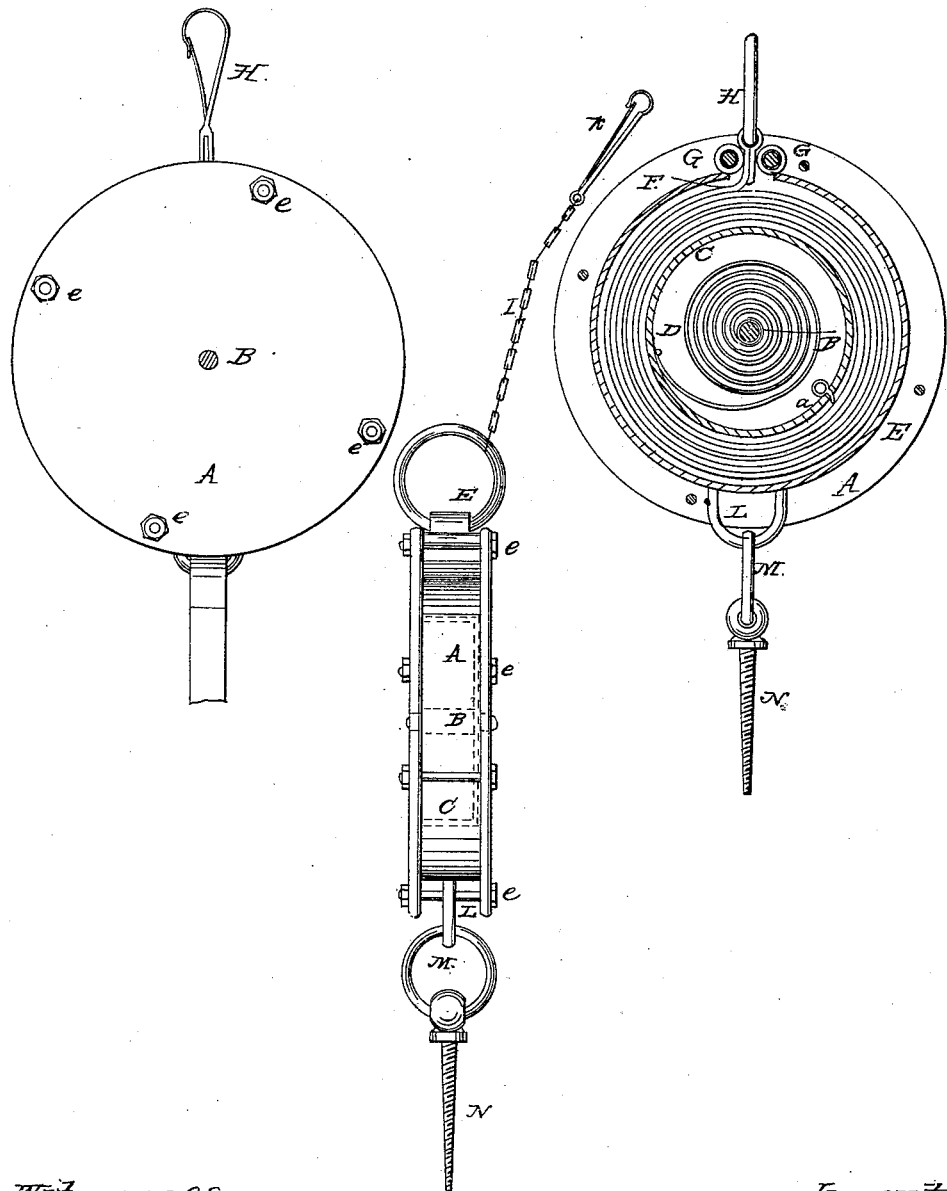
Witnesses
James F. Graham
C. H. McNeil
Inventor
Charles Rogers

UNITED STATES PATENT OFFICE.

CHAS. ROGERS, OF BERGEN, NEW JERSEY.

IMPROVEMENT IN DEVICES FOR HITCHING HORSES.

Specification forming part of Letters Patent No. 59,660, dated November 13, 1866.

*To all whom it may concern:*

Be it known that I, CHARLES ROGERS, of Bergen, in the county of Hudson and State of New Jersey, have invented a new and Improved Device for Hitching Horses; and I do hereby declare that the following is a full, clear, and exact description thereof, reference being had to the accompanying drawings, forming part of this specification.

The nature of my invention consists in constructing in a simple, cheap, and novel manner a device by which horses may be hitched and secured in stalls or stables, also in the streets, without any liability or danger of getting their feet over the halter and being cast and losing their lives thereby, or being injured.

The general method of securing horses and other animals in stalls is tying them with ropes or halters, which necessarily requires a long slack rope for the purpose of allowing them to eat and to lie down to rest, which, if the animal brings its head near to the point where it is hitched, allows the slack of the rope or halter to fall down about the feet of the animal. It is therefore very liable to get its feet over the rope or halter, so that when the animal moves its head it finds itself entangled, and in the efforts of releasing itself becomes cast, and if not soon discovered and released soon dies or is badly injured.

By my invention I am enabled to overcome and avoid all the difficulty and danger to which the animal is subjected by the old method of hitching by providing a case or box of proper form and construction, in which I erect a post or shaft that passes through the center of the said box or case. To this shaft or post I secure one end of a common coiled spring, the other end of which I attach to a rim that is fitted to the inside of the case or box. To this rim I also attach one end of a strap or web that is also coiled around the said rim, with one end of the said strap or web projecting just outside of the case or box, where it connects with a short piece of chain, say ten or twelve inches long, in the end of which is a snap-hook that hitches into the ring of the head-stall, so that the strap may be drawn out of the box or case, and when released by the action of the spring it is drawn into the case, so that no slack is ever allowed, thus rendering it impossible for an animal to get his feet over and being cast.

The advantages of my invention will be seen at once by the owners of horses and other animals that are required to be kept in stables, from its cheapness, simplicity and safety.

To enable others skilled in the art to make and use my invention, I will proceed to describe its construction and operation.

Figure 1 is a top-plan view of my improved device for hitching horses in stables, with the top removed, showing the spring and strap. Fig. 2 is a top view of the same, showing the cover and the plan they are to be made when designed to be used in the street. Fig. 3 is a side elevation of Fig. 1.

Letters of like name and kind refer to like parts in each of the figures.

A represents a box or case, that may be made of any suitable metal, leather, or other suitable material, either in two sections or one section, with simply a cap. This said case A may be of any convenient or desired form and dimensions; but for economy and convenience I prefer to make them circular in form, or nearly so.

In the center of the said case or box A, I secure a post or shaft, B, that has bearings at each end in the case or box A. To this said post or shaft B is secured one end of a coiled spring, D, the opposite end of which is secured to a cylinder, C. This said cylinder C is made of suitable metal, with a plate at the bottom that covers the whole area of the surface of the cylinder, and is attached in the center to the lower end of the post or shaft B, upon which it turns, the said post keeping it always in its position.

At one side of the rim of the said cylinder is a slot, a, that extends down to the bottom plate or disk, or in place of the said slot may be simply a mortise, through which is firmly secured one end of the strap or web E, which is shown coiled around the said cylinder C, with the opposite end projecting out of the side of the case A, as represented at F, Fig. 1.

G G are friction-rollers located at the orifice in the side of the case or box A, for the purpose of allowing the strap or web to pass out and into the box or case A more freely than it otherwise would, as it would be liable to great friction in drawing across the corners or edges of the case as it passed out and in.

H is a snap-hook, of common form and construction, attached firmly to the strap or web E, for the purpose of hitching the animal quickly in any desired place. This arrangement is designed to be attached to the bridle-bit for the use of truckmen, peddlers, &c., for hitching horses upon the street.

I is a chain, a few inches in length, attached to a ring, J, which is attached to the strap or web E. Upon the end of the chain I is a snap-hook, K, designed to be used in hitching horses in stalls.

In the opposite side of the case A from where the strap draws out is rigidly secured a staple, L, to which is attached a ring, M. To this ring or link M is a tapering wood-screw, N, for the purpose of screwing into the side of the stall or other convenient place where the horse or animal is designed to be secured.

*e e e e* are bolts that secure the two sections or cap to the case or box A, thus inclosing the spring, or web, or strap closely within the case and making it one of the safest of the known devices for hitching horses.

I do not claim, broadly, the device for taking up the strap or belt separately considered, for this has been used before for the same purpose. Neither do I claim the chain and snap-hook at the outer end of the belt; but What I do claim, and desire to secure by Letters Patent, is—

The combination of the case A, center-pin B, cap C, spring D, strap E, rollers G, staple L, and hook H, when these several parts are constructed and arranged substantially as herein shown and described, and for the purposes set forth.

CHARLES ROGERS.

Witnesses:
JAMES T. GRAHAM,
C. H. MCNEIL.